US009831741B2

(12) United States Patent
Fan et al.

(10) Patent No.: US 9,831,741 B2
(45) Date of Patent: Nov. 28, 2017

(54) TERMINAL MECHANISM, PERMANENT MAGNET ADJUSTABLE-SPEED MOTOR AND CENTRIFUGAL REFRIGERATION COMPRESSOR

(71) Applicant: Gree Electric Appliances, Inc. of Zhuhai, Zhuhai (CN)

(72) Inventors: Zhao Fan, Zhuhai (CN); Yabin Ding, Zhuhai (CN); Guoyao Li, Zhuhai (CN); Huaican Liu, Zhuhai (CN)

(73) Assignee: GREE ELECTRICAL APPLIANCES, INC. OF ZHUHAI, Zhuhai (CN)

( * ) Notice: Subject to any disclaimer, the term of this patent is extended or adjusted under 35 U.S.C. 154(b) by 189 days.

(21) Appl. No.: 15/011,614

(22) Filed: Jan. 31, 2016

(65) Prior Publication Data

US 2016/0149464 A1    May 26, 2016

Related U.S. Application Data

(63) Continuation of application No. PCT/CN2014/082804, filed on Jul. 23, 2014.

(30) Foreign Application Priority Data

Jul. 31, 2013    (CN) .......................... 2013 1 0329687

(51) Int. Cl.
*H02K 11/00*    (2016.01)
*H02K 5/22*    (2006.01)
*H01R 9/24*    (2006.01)

(52) U.S. Cl.
CPC ............... *H02K 5/225* (2013.01); *H01R 9/24* (2013.01); *H02K 5/22* (2013.01); *H02K 2213/03* (2013.01)

(58) Field of Classification Search
CPC .................................. H02K 5/225; H01R 9/24
(Continued)

(56) References Cited

U.S. PATENT DOCUMENTS 3,683,371 A * 8/1972 Holz ........................ G06C 7/02
178/17 C
2004/0232818 A1* 11/2004 Miyamoto ............ H01J 29/485
313/441
(Continued)

FOREIGN PATENT DOCUMENTS

CN    101212157 A    7/2008
CN    101719645 A    6/2010
(Continued)

*Primary Examiner* — Thanh Lam
(74) *Attorney, Agent, or Firm* — Franklin & Associates International Inc; Matthew F. Lambrinos

(57) ABSTRACT

Disclosed are a terminal mechanism, a permanent magnet adjustable-speed motor and a centrifugal refrigeration compressor. The terminal mechanism comprises a terminal board, power supply connectors and sealing rings; the terminal board is made of steel, and the magnetic permeability $\mu$ of the steel is less than or equal to $1.31 \times 10^{-6}$ H/m. The terminal board is a flat board having an upper surface and a lower surface, and is provided with terminal holes thereon. The sealing rings are sleeved on the power supply connectors. The power supply connectors are fixed on the terminal board through the terminal holes. The sealing rings are in sealing engagement with the terminal board, so as to reduce heat generated by an electric eddy current.

20 Claims, 2 Drawing Sheets

(58) Field of Classification Search
USPC .............................................. 310/43–44, 71
See application file for complete search history.

(56) References Cited

U.S. PATENT DOCUMENTS

| | | | |
|---|---|---|---|
| 2015/0038016 A1* | 2/2015 | Smith .................... | H02K 5/225 439/625 |
| 2015/0054360 A1* | 2/2015 | Tanaka ................... | C21D 6/002 310/44 |
| 2016/0134173 A1* | 5/2016 | Deak, Sr. ............... | H02K 35/02 290/1 A |

FOREIGN PATENT DOCUMENTS

| | | |
|---|---|---|
| CN | 203406724 U | 1/2014 |
| JP | S52129902 U | 10/1977 |
| JP | 2010-153714 A | 7/2010 |
| KR | 10-2011-0115943 A | 10/2011 |
| WO | 2008/007534 A1 | 1/2008 |

* cited by examiner

TERMINAL MECHANISM, PERMANENT MAGNET ADJUSTABLE-SPEED MOTOR AND CENTRIFUGAL REFRIGERATION COMPRESSOR

CROSS REFERENCE TO RELATED APPLICATIONS

This application claims the benefit of priority of Chinese Patent Application No. 201310329687.9, filed on Jul. 31, 2013, entitled "Terminal mechanism, Permanent Magnet Adjustable-Speed Motor and Centrifugal Refrigeration Compressor", the entire contents of which are incorporated herein by reference.

TECHNICAL FIELD

The present disclosure relates to a motor, more particularly, to a terminal mechanism which is applied in the motor, has good heat dissipation and can be sealed, and to a permanent magnet adjustable-speed motor and a centrifugal refrigeration compressor.

BACKGROUND

In the prior art, as for a permanent magnet adjustable-speed motor, the terminal components of the motor, which is made of common steel, is apt to generate heat due to the influence of electric eddy currents. Based on the law of electromagnetic induction, the induced electromotive force $E=d\psi/dt$. The greater the frequency and the less dt are, the greater the induced electromotive force E is. Accordingly, the induced current increases and the generated heat increases, and the temperature is so high that the reliability turns bad even to cause potential safety hazard. Especially for a centrifugal refrigeration compressor which utilizes a permanent magnet adjustable-speed motor, if the terminal board generates much heat, a sealing failure may be caused, resulting in leakage of the coolant for cooling the motor.

While the terminal component of the motor, which is made of electrical insulating materials, has a large volume, is difficult to produce, and has low reliability.

In view of the defects above, the inventors finally obtained the present invention after a long period of research and practice.

SUMMARY OF THE INVENTION

The present disclosure provides a terminal mechanism, a permanent magnet adjustable-speed motor and a centrifugal refrigeration compressor, which are capable of reducing the heating effect.

The present disclosure provides a terminal mechanism, which comprises a terminal board and power supply connectors, wherein the terminal mechanism further comprises sealing rings;

the terminal board is made of steel, and magnetic permeability μ of the steel is less than or equals to $1.31 \times 10^{-6}$ H/m;

the terminal board is a flat board having an upper surface and a lower surface, and is provided with terminal holes thereon;

each sealing ring is sleeved on corresponding power supply connector; the power supply connectors are fixed on the terminal board through the terminal holes; and the sealing rings are in sealing engagement with the terminal board.

In one of the embodiments, the terminal hole is a ramped through hole with a variable cross-section.

In one of the embodiments, an inner wall of each terminal hole comprises two stages of slopes, namely a first slope and a second slope; the first slope is disposed close to the upper surface of the terminal board; the sealing ring is in sealing engagement with the first slope;

a first angle formed between the first slope and the upper surface and a second angle formed between the second slope and the upper surface are both less than 90°.

In one of the embodiments, gradient of the first slope is greater than gradient of the second slope.

In one of the embodiments, the gradient of the first slope is ranged from 77° to 79°, and the gradient of the second slope is ranged from 44° to 46°.

In one of the embodiments, the gradient of the first slope is 78°.

In one of the embodiments, an annular lug boss is provided on each power supply connector; a lower surface of the annular lug boss is provided with an annular groove;

a cross-section shape and a diameter of the annular groove are respectively configured to match with a cross-section shape and a diameter of the sealing ring;

the sealing ring is disposed inside the annular groove.

In one of the embodiments, the terminal mechanism further comprises a sensor connector and gaskets.

In one of the embodiments, a sensor terminal hole is disposed in the terminal board;

the sensor connector is fixed on the terminal board through the sensor terminal hole;

the gasket is annular, and a diameter at one end of the gasket is smaller than a diameter at the other end; the end with smaller diameter of the gasket is installed in the sensor terminal hole; two gaskets are sleeved on the sensor connector; and two gaskets are in sealing engagement with the upper surface and the lower surface of the terminal board respectively.

In one of the embodiments, voids are provided between the terminal board, the gaskets and the sensor connector.

In one of the embodiments, the steel is austenitic stainless steel.

A permanent magnet adjustable-speed motor comprises the terminal mechanism described above.

A centrifugal refrigeration compressor comprises the permanent magnet adjustable-speed motor above.

As compared with the prior art, the present disclosure has beneficial effects as follows: the terminal mechanism, the permanent magnet adjustable-speed motor and the centrifugal refrigeration compressor of the present disclosure can effectively solve the problem of the excessively high temperature of the terminal mechanism due to heat generated by an electric eddy current; the present disclosure has good sealing effect which is ensured in multiple ways through multi-level designs; the present disclosure has small volume, is easy to produce, and has high reliability and high safety; the present disclosure is highly integrated, which reduces the assembling procedures and increases the productivity.

DETAILED DESCRIPTION OF THE PREFERRED EMBODIMENTS

In order to solve the problem of excessively high temperature, the present disclosure provides a terminal mechanism, a permanent magnet adjustable-speed motor and a centrifugal refrigeration compressor, which are capable of reducing the heating effect.

The above and other technical features and advantages of the present disclosure will now be described in more details with reference to the accompanying figures.

Figure 1:
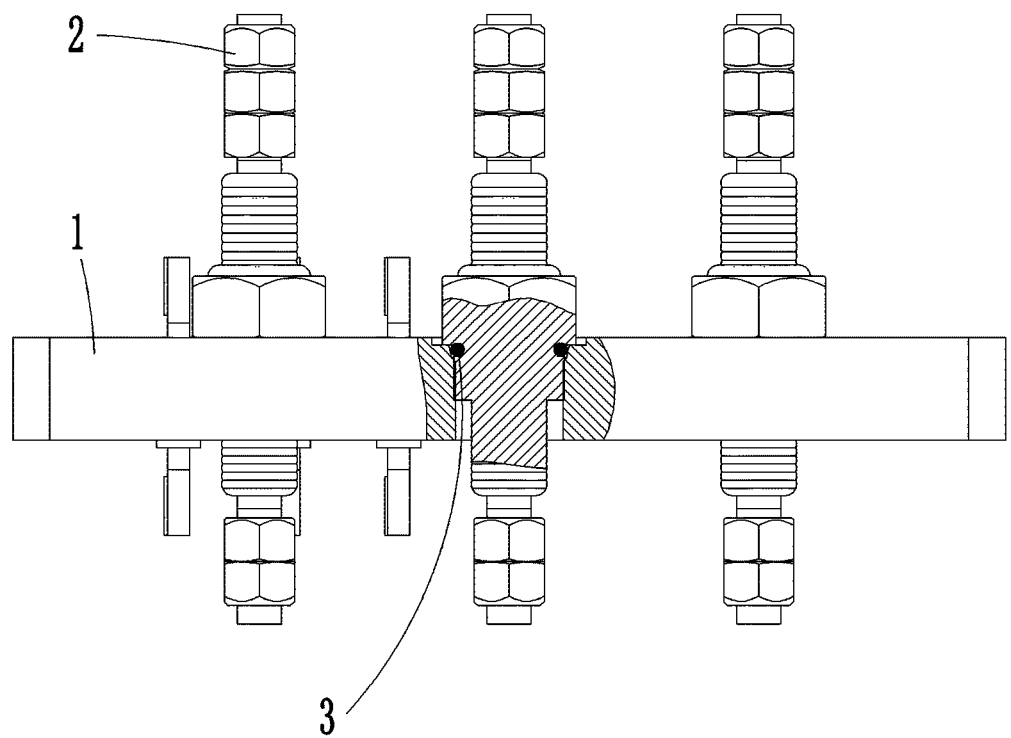
FIG. 1 is a schematic front diagram of the terminal mechanism.

FIG. 1 is a schematic front diagram of the terminal mechanism. As shown in FIG. 1, the terminal mechanism includes a terminal board 1, power supply connectors 2 and sealing rings 3.

The terminal board 1 is a flat board and made of steel. In order to prevent the terminal board from generating heat due to the effects of electric eddy currents, the magnetic permeability $\mu$ of the steel is no greater than $1.31 \times 10^{-6}$ H/m (wherein the magnetic induction intensity $B=\mu H$). Preferably, the steel is nonmagnetic steel, namely the stable austenitic steel, which has no ferromagnetism and will not be magnetized. The electromagnetism property of the nonmagnetic steel is determined by its metallographic structure. The terminal board 1 made of the nonmagnetic steel has stable structure, low magnetic permeability, extremely low eddy current losses in the magnetic field, good insulating property, good conductivity and excellent mechanical property.

Generally, all austenitic stainless steel can be utilized as nonmagnetic steel. Austenitic stainless steel is a kind of stainless steel with austenite structure under a normal temperature. Wherein, the content of Cr is about 17%~19%, and the content of Ni is about 7%~15%. The steel of the terminal board 1 may contain a small amount of ferrite and martensite, but it should be met that the magnetic permeability $\mu$ of the steel is not greater than $1.31 \times 10^{-6}$ H/m.

When an electric eddy current is generated in the terminal board 1, not too much heat will be accumulated, thereby the terminal board is prevented from being heated effectively. Since the distance between the selected power supply connectors 2 needs not to be controlled strictly, the overall volume of the terminal mechanism can be effectively limited. The metal material has high reliability and is easily damaged.

An annular groove is disposed at the sealing surface of each power supply connector 2. The diameter of the annular groove is identical to the diameter of the sealing ring 3. The annular groove is configured to preliminarily locate the sealing ring 3. The sealing ring 3 is sleeved on the power supply connector 2 and placed inside the annular groove of the power supply connector 2, so as to avoid a displacement of the sealing ring 3 before the power supply connector 2 is fastened. In this embodiment, an annular lug boss is disposed on the power supply connector 2, and the lower surface of the annular lug boss forms the sealing surface of the power supply connector 2.

In this embodiment, the cross-section of the sealing ring 2 is circular, and the cross-section of the annular groove is semi-circular. The depth of the annular groove is equal to or less than the radius of the circular cross-section of the sealing ring 3. The cross-section of the sealing ring 3 may be rectangle or other shapes, and the cross-section shape of the annular groove is configured to match with that of the sealing ring 3, so that the sealing ring will be clamped and will not fall off. Alternatively, the sealing ring 3 can be preliminarily fixed by applying a little mild adhensive agent in the annular groove.

The power supply connector 2 goes through a terminal hole in the terminal board 1. The sealing surface of the power supply connector 2 presses against the sealing ring 3, forcing the sealing ring 3 to tightly engage with the terminal board 1. The power supply connector 2 is fixed on the terminal board 1 with a connector nut.

The sealing ring 3 is a closed annular ring made of elastic materials. The sealing ring 3 is made of rubber, preferably, is made of hydrogenated nitrile-butadiene rubber.

Figure 2:
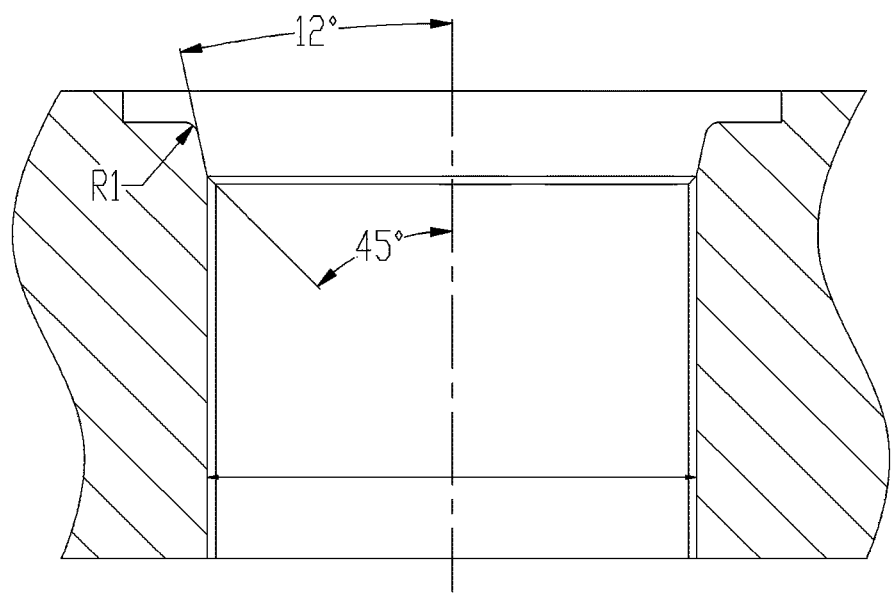
FIG. 2 is a schematic sectional diagram illustrating the sealing groove of the terminal mechanism.

FIG. 2 is a schematic sectional diagram of the sealing groove of the terminal mechanism, illustrating the structure at the assembling and sealing region of each of the terminal holes for the main connectors U, V and W of the three-phase power supply.

The terminal hole is a ramped through hole with a variable cross-section. The part of the terminal hole, which is close to the upper surface of the terminal board 1, is a countersunk hole with a larger diameter, which is configure to partially accommodate the connector nut of the power supply connector 2 and position the connector nut, and the height of the countersunk hole is designed according to requirements. A first slope is disposed in contiguity with the countersunk hole, and a chamfer R1 is made at the joint of the first slope and the countersunk hole, so as to prevent the sealing ring 3 from being scratched when the sealing ring 3 is assembled. A second slope is disposed in contiguity with the first slope. The first slope is connected to the second slope sleekly.

The height of the first slope approximates to the height of the sealing ring 3, so that the sealing ring 3 substantially abuts against the first slope after it is pressed into the countersunk hole.

The gradient of the first slope is ranged from 77° to 79°, and gradient of the second slope is ranged from 44° to 46°. Preferably, the gradient of the first slope is 78°, the amount of the generated deformation of the sealing ring 3 is just suitable under this gradient. If the gradient of the first slope is greater than 79°, the amount of the deformation of the sealing ring 3 will be too large; if the gradient of the first slope is less than 77°, the amount of the deformation of the sealing ring 3 will be too small, and the best sealing effect cannot be realized in both cases. Preferably, the gradient of the second slope is 45°.

During fastening the connector, the sealing ring 3 is pushed into the ramped through hole under the press of the sealing surface of the power supply connector 2. As the connector nut is engaging with the bottom surface of the countersunk hole, the sealing ring 3 is slightly pressed and deformed in the ramped through hole, so that a tight seal is formed between the power supply connector 2 and the terminal board 1. This manner of seal can achieve a good sealing effect, and there is no need to provide a sealing ring accommodating groove in the upper surface of the terminal board 1, thereby reducing processing difficulties and increasing the processing efficiency.

Figure 3:
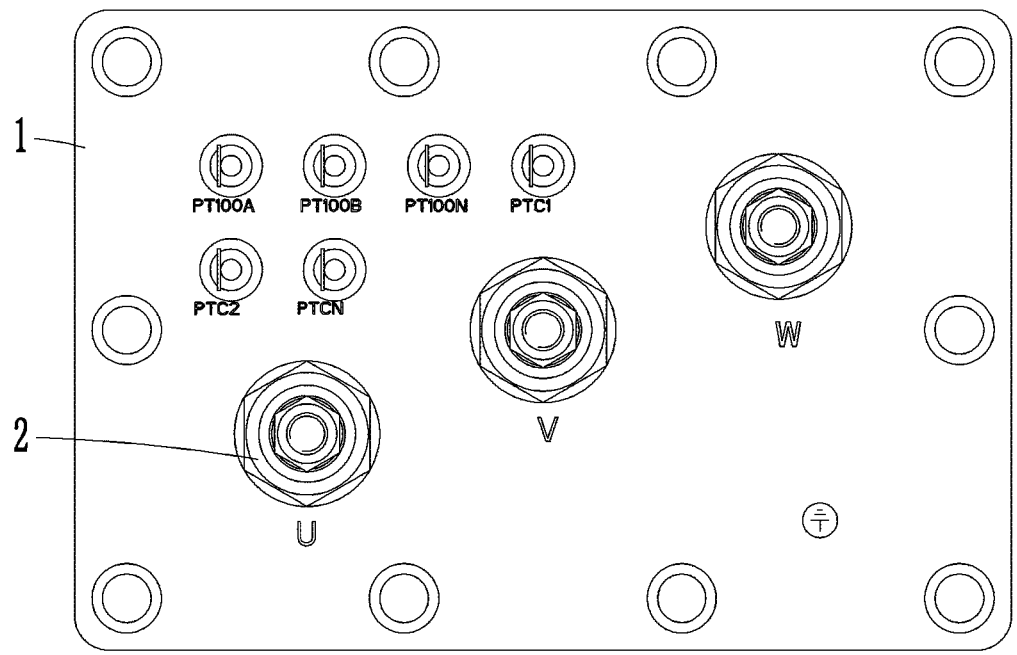
FIG. 3 is a schematic top diagram of the terminal mechanism.

FIG. 3 is a schematic top diagram of the terminal mechanism. As shown in FIG. 3, in this embodiment, the terminal board 1 is rectangle-shaped, and it may be designed to be any other shape which is adapted for arranging the connectors and other accessories required.

Terminal elements for sensors can also be arranged on the terminal board 1. In this embodiment, the terminal board 1 is provided with temperature measuring ends for measuring temperature of the bearings and the windings of the motor, such as PT100 and PTC. The operating current of the temperature measuring ends is less than 2 mA, and the temperature measuring ends are connected with the sealed terminal board through glass frit, so as to realize effects of fixing and sealing.

Figure 4:
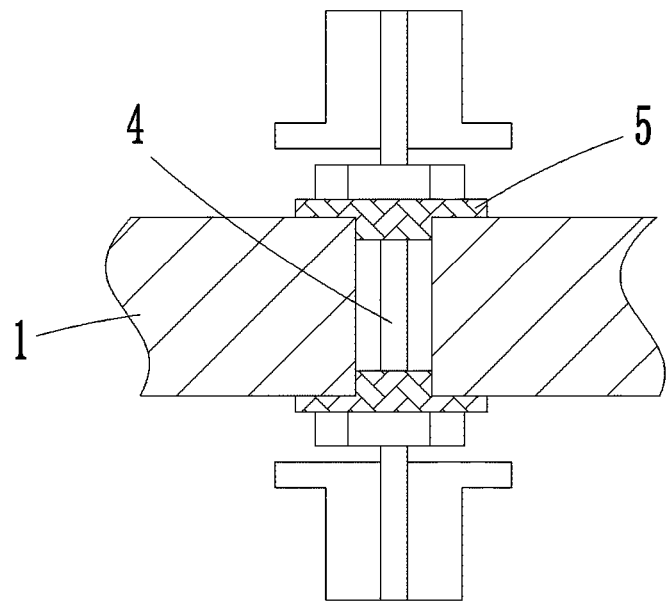
FIG. 4 is a schematic sectional diagram illustrating the temperature measuring end of the terminal mechanism.

FIG. 4 is a schematic sectional diagram illustrating the temperature measuring end of the terminal mechanism. As shown in FIG. 4, the temperature measuring end comprises a sensor connector 4 and gaskets 5. A sensor terminal hole is arranged in the terminal board 1, and the sensor terminal hole is a conventional through hole.

The gasket 5 is annular, and the diameter at one end of the gasket 5 is smaller than the diameter at the other end. The end with a smaller diameter of the gasket 5 is installed in the sensor terminal hole. Preferably, the fit between the two is an interference fit, so as to realize good sealing effects.

Two gaskets 5 are sleeved on the sensor connector 4. The sensor connector 4 is fixed on the terminal board 1 through the sensor terminal hole. The two gaskets 5 are in sealing engagement with the upper surface and the lower surface of the terminal board 1 respectively.

Voids are provided between the sensor connector 4, the terminal board 1 and the gaskets 5, in order to provide space in case that the gaskets 5 are deformed under forces generated in tightening the nut or generated due to cold shrinkage and thermal expansion of the gaskets 5, thereby ensuring the air tightness of the terminal board 1. Preferably, the gaskets 5 are made of insulating polytetrafluoroethylene.

In this embodiment, the sensor connector 4 for measuring temperature is a conductive post. Both the power supply connectors and the sensor connector are provided on the terminal board 1, without the need of providing a individually set junction box in the prior art, therefore the permanent magnet adjustable-speed motor and the centrifugal refrigeration compressor, which are provided with the terminal mechanism, are simpler, more aesthetically pleasing and highly integrated, and need less assembling procedures.

What described above are several embodiments of the present invention, and they are specific and in details, but not intended to limit the scope of the present invention. It will be understood by those skilled in the art that various modifications and improvements can be made without departing from the spirit of the present invention, and all these modifications and improvements are within the scope of the present invention.

What is claimed is:

1. A terminal mechanism, comprising a terminal hoard and power supply connectors, wherein, the terminal mechanism further comprises sealing rings;
the terminal board is made of steel, and magnetic permeability μ of the steel is less than or equals to $1.31\times10^{-6}$ Him;
the terminal board is a flat board having an upper surface and a lower surface, and is provided with terminal holes thereon;
each sealing ring is sleeved on corresponding power supply connector; the power supply connectors are fixed on the terminal hoard through the terminal holes; and the sealing rings are in sealing engagement with the terminal board.

2. The terminal mechanism according to claim 1, wherein, the terminal hole is a ramped through hole with a variable cross-section.

3. The terminal mechanism according to claim 2, wherein, an inner wall of each terminal hole comprises two stages of slopes, namely a first slope and a second slope; the first slope is disposed close to the upper surface of the terminal board; the sealing ring is in sealing engagement with the first slope;
a first angle formed between the first slope and the upper surface and a second angle formed between the second slope and the upper surface are both less than 90°.

4. The terminal mechanism according to claim 3, wherein, gradient of the first slope is greater than gradient of the second slope.

5. The terminal mechanism according to claim 4, wherein, the gradient of the first slope is ranged from 77° to 79°, and the gradient of the second slope is ranged from 44° to 46°.

6. The terminal mechanism according to claim 5, wherein, the gradient of the first slope is 78°.

7. The terminal mechanism according to claim 1, wherein, an annular lug boss is provided on each power supply connector; a lower surface of the annular lug boss is provided with an annular groove;
a cross-section shape and a diameter of the annular groove are respectively configured to match with a cross-section shape and a diameter of the sealing ring;
the sealing ring is disposed inside the annular groove.

8. The terminal mechanism according to claim 2, wherein, an annular lug boss is provided on each power supply connector; a lower surface of the annular lug boss is provided with an annular groove;
a cross-section shape and a diameter of the annular groove are respectively configured to match with a cross-section shape and a diameter of the sealing ring;
the sealing ring is disposed inside the annular groove.

9. The terminal mechanism according to claim 3, wherein, an annular lug boss is provided on each power supply connector; a lower surface of the annular lug boss is provided with an annular groove;
a cross-section shape and a diameter of the annular groove are respectively configured to match with a cross-section shape and a diameter of the sealing ring;
the sealing ring is disposed inside the annular groove.

10. The terminal mechanism according to claim 4, wherein, an annular lug boss is provided on each power supply connector; a lower surface of the annular lug boss is provided with an annular groove;
a cross-section shape and a diameter of the annular groove are respectively configured to match with a cross-section shape and a diameter of the sealing ring;
the sealing ring is disposed inside the annular groove.

11. The terminal mechanism according to claim 5, wherein, an annular lug boss is provided on each power supply connector; a lower surface of the annular lug boss is provided with an annular groove;
a cross-section shape and a diameter of the annular groove are respectively configured to match with a cross-section shape and a diameter of the sealing ring;
the sealing ring is disposed inside the annular groove.

12. The terminal mechanism according to claim 6, wherein, an annular lug boss is provided on each power supply connector; a lower surface of the annular lug boss is provided with an annular groove;
a cross-section shape and a diameter of the annular groove are respectively configured to match with a cross-section shape and a diameter of the sealing ring;
the sealing ring is disposed inside the annular groove.

13. The terminal mechanism according to claim 1, wherein, the terminal mechanism further comprises a sensor connector and gaskets.

14. The terminal mechanism according to claim 13, wherein, a sensor terminal hole is disposed in the terminal board;

the sensor connector is fixed on the terminal board through the sensor terminal hole;

the gasket is annular, and a diameter at one end of the gasket is smaller than a diameter at the other end; the end with smaller diameter of the gasket is installed in the sensor terminal hole; two gaskets are sleeved on the sensor connector; and two gaskets are in sealing engagement with the upper surface and the lower surface of the terminal hoard respectively.

15. The terminal mechanism according to claim 14, wherein, voids are provided between the terminal board, the gaskets and the sensor connector.

16. The terminal mechanism according to claim 1, wherein, the steel is austenitic stainless steel.

17. A permanent magnet adjustable-speed motor, comprising the terminal mechanism of claim 1.

18. The permanent magnet adjustable-speed motor according to claim 17, wherein, the terminal hole is a ramped through hole with a variable cross-section.

19. The permanent magnet adjustable-speed motor according to claim 18, wherein, an inner wall of each terminal hole comprises two stages of slopes, namely a first slope and a second slope; the first slope is disposed close to the upper surface of the terminal board; the sealing ring is in sealing engagement with the first slope;

a first angle formed between the first slope and the upper surface and a second angle formed between the second slope and the upper surface are both less than 90°.

20. A centrifugal refrigeration compressor, comprising the permanent magnet adjustable-speed motor of claim 17.

\* \* \* \* \*